United States Patent
Yu et al.

(10) Patent No.: US 11,588,665 B2
(45) Date of Patent: Feb. 21, 2023

(54) VXLAN PACKET ENCAPSULATION AND POLICY EXECUTION METHOD, AND VXLAN DEVICE AND SYSTEM

(71) Applicant: Huawei Technologies Co., Ltd., Shenzhen (CN)

(72) Inventors: Bin Yu, Nanjing (CN); Ting Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 17/157,089

(22) Filed: Jan. 25, 2021

(65) Prior Publication Data

US 2021/0144028 A1    May 13, 2021

Related U.S. Application Data

(63) Continuation of application No. PCT/CN2019/094635, filed on Jul. 4, 2019.

(30) Foreign Application Priority Data

Jul. 25, 2018   (CN) .......................... 201810826130.9

(51) Int. Cl.
 *H04L 12/46*   (2006.01)
 *H04L 45/74*   (2022.01)

(52) U.S. Cl.
 CPC ........ *H04L 12/4633* (2013.01); *H04L 12/465* (2013.01); *H04L 45/74* (2013.01)

(58) Field of Classification Search
 CPC ... H04L 12/4633; H04L 12/465; H04L 45/74; H04L 45/68; H04L 12/2859; H04L 12/4641; H04L 29/06068; H04L 29/06551; H04L 2012/4629; H04L 12/467; H04L 45/50; H04L 47/2475; H04L 12/4654
 (Continued)

(56) References Cited

U.S. PATENT DOCUMENTS

2015/0009995 A1*  1/2015  Gross, IV ............... H04L 45/74
                                                                370/392
2015/0063158 A1   3/2015  Nedeltchev et al.
 (Continued)

FOREIGN PATENT DOCUMENTS

CN    101150493 A    3/2008
CN    102769557 A    11/2012
 (Continued)

OTHER PUBLICATIONS

Tilli, J-M., et al. "Data Plane Protocols and Fragmentation for 5G", 2017 IEEE Conference on Standards for Communications and Networking (CSCN), 7 pages.
 (Continued)

*Primary Examiner* — Mang Hang Yeung
(74) *Attorney, Agent, or Firm* — Conley Rose, P.C.

(57) ABSTRACT

In a virtual extensible local area network (VXLAN) packet encapsulation and policy execution method, a communications device determines an application identifier for identifying an application type of an Ethernet frame, and places the application identifier in a VXLAN header. Another device may directly execute a corresponding policy based on the application identifier in the VXLAN header and without analyzing a packet.

20 Claims, 5 Drawing Sheets

(58) Field of Classification Search
USPC .......................................................... 370/392
See application file for complete search history.

(56) References Cited

U.S. PATENT DOCUMENTS

| | | | |
|---|---|---|---|
| 2016/0080253 A1 | 3/2016 | Wang et al. | |
| 2016/0149808 A1 | 5/2016 | Cai et al. | |
| 2017/0237650 A1 | 8/2017 | Beeram et al. | |
| 2020/0036610 A1* | 1/2020 | Indiresan | ................ H04L 69/22 |

FOREIGN PATENT DOCUMENTS

| | | |
|---|---|---|
| CN | 104468384 A | 3/2015 |
| CN | 104601467 A | 5/2015 |
| CN | 104954186 A | 9/2015 |
| CN | 105681198 A | 6/2016 |
| CN | 105827495 A | 8/2016 |
| CN | 105915427 A | 8/2016 |
| CN | 107547343 A | 1/2018 |
| EP | 2993835 A1 | 3/2016 |

OTHER PUBLICATIONS

Sarikaya, B., et al., "Quality of Service Marking in Virtual extensible Local Area NeTwork-draft-sarikaya-vxlan-qosmarking-00 .txt", Network Working Group, Internet-Draft, Feb. 10, 2014, 10 pages.
Yang, G., "Research and Implementation of VXLAN Technology Based under SDN Architecture," 2015, 71 pages.

* cited by examiner

Example 1:

| Application identifier | Policy |
|---|---|
| 1 | Reserve a bandwidth of 10 Mbps |

Example 2:

| Application identifier | Policy |
|---|---|
| 2 | Select a low-latency path |

Example 3:

| Group identifier | Application identifier | Policy |
|---|---|---|
| V1 | 3 | Reserve a bandwidth of 1 Gbps, and provide a highest forwarding priority |
| V1 | 4 | Provide a medium forwarding priority |

Examples 4 and 5:

| Group identifier | Application identifier | Destination | Policy |
|---|---|---|---|
| 2 | 5 | Server 106 | Discard |
| 2 | 4 | Server 106 | Forward |

FIG. 7

VXLAN PACKET ENCAPSULATION AND POLICY EXECUTION METHOD, AND VXLAN DEVICE AND SYSTEM

CROSS-REFERENCE TO RELATED APPLICATIONS

This is a continuation of Int'l Patent App. No. PCT/CN2019/094635 filed on Jul. 4, 2019, which claims priority to Chinese Patent App. No. 201810826130.9 filed on Jul. 25, 2018, which are incorporated by reference.

FIELD

This disclosure relates to the communications field, and in particular, to a Virtual Extensible Local Area Network (VXLAN) packet encapsulation and policy execution method, and a VXLAN device and system.

BACKGROUND

A network device analyzes a received packet to execute a corresponding policy for the packet. In the foregoing scenario, a plurality of network devices on a packet forwarding path need to analyze packets to determine policies. Consequently, the network devices are burdened with analyzing a large quantity of packets.

SUMMARY

This disclosure provides a VXLAN packet encapsulation and policy execution method, and a VXLAN device and system, to alleviate network load.

According to a first aspect, a VXLAN packet encapsulation method is provided. The method includes: A communications device obtains an Ethernet frame. The communications device encapsulates a VXLAN header including an application identifier in the Ethernet frame to obtain a VXLAN packet. The application identifier is used to identify an application type of the Ethernet frame. The application identifier is identified based on a payload of the Ethernet frame and an application identification rule.

Because the communications device determines the application identifier and places the application identifier in the VXLAN header, another device may directly execute a corresponding policy based on the application identifier in the VXLAN header, without analyzing the packet. Therefore, this solution alleviates network load.

With reference to the first aspect, in a first implementation of the first aspect, the application identification rule includes identifying one or more of a protocol type of the payload, an access target, or a usage purpose of the Ethernet frame.

With reference to the first implementation of the first aspect, in a second implementation of the first aspect, the application identification rule includes one or more of the following: determining the protocol type based on a transport layer protocol port number in the payload of the Ethernet frame; determining the protocol type based on a specific character string in the payload of the Ethernet frame; determining the access target of the Ethernet frame based on a destination Internet Protocol (IP) address field in the payload of the Ethernet frame; and determining the usage purpose of the Ethernet frame based on content of the Ethernet frame.

With reference to the first aspect, and the first implementation of the first aspect or the second implementation of the first aspect, in a third implementation of the first aspect, the method further includes: The communications device executes a policy based on a tuple, according to a policy configuration. The tuple includes the application identifier. The communications device encapsulating the VXLAN packet may execute the policy, so that a policy enforcement point is closer to a terminal.

With reference to the first aspect, and the first implementation of the first aspect or the second implementation of the first aspect, in a fourth implementation of the first aspect, the VXLAN header further includes a group identifier. The group identifier is determined based on a source of the Ethernet frame and a group mapping. The group mapping is a mapping from at least one address to at least one group identifier. The group identifier may be used to distinguish between sources of the Ethernet frame. Optionally, the source of the Ethernet frame includes one or more of the following: an address of a device sending the Ethernet frame, a virtual local area network identifier of the Ethernet frame, and a port number of a port used by the communications device to receive the Ethernet frame. An outer IP header of the VXLAN packet does not include source information of an original Ethernet frame. Therefore, a policy enforcement point needs to decapsulate the VXLAN packet before executing a packet source-based policy. The group identifier reflecting a packet source is placed in the VXLAN header to alleviate network load.

With reference to the fourth implementation of the first aspect, in a fifth implementation of the first aspect, the method further includes: The communications device executes a policy based on a tuple, according to a policy configuration. The tuple includes the group identifier and the application identifier.

With reference to the third implementation or the fifth implementation of the first aspect, in a sixth implementation of the first aspect, the tuple further includes a destination of the Ethernet frame.

With reference to any one of the fourth implementation to the sixth implementation of the first aspect, in a seventh implementation of the first aspect, the method further includes: The communications device receives the group mapping sent by a controller, an authentication server, or an authenticator device.

With reference to any one of the first aspect, or the first implementation to the seventh implementation of the first aspect, in an eighth implementation of the first aspect, the method further includes: The communications device discards or sends the VXLAN packet.

According to a second aspect, a VXLAN policy execution method is provided. The method includes: A communications device receives a VXLAN packet. A VXLAN header of the VXLAN packet includes an application identifier. The application identifier is used to identify an application type of an inner Ethernet frame in the VXLAN packet. The communications device executes a policy based on a tuple, according to a policy configuration. The tuple includes the application identifier in the VXLAN packet. The communications device may directly execute a corresponding policy based on the application identifier in the VXLAN header, without analyzing the packet. Therefore, this solution alleviates network load.

With reference to the second aspect, in a first implementation of the second aspect, the VXLAN header further includes a group identifier. The tuple further includes the group identifier.

With reference to the second aspect or the first implementation of the second aspect, in a second implementation of the second aspect, the tuple further includes a destination of the inner Ethernet frame.

With reference to the second aspect, and the first implementation of the second aspect or the second implementation of the second aspect, in a third implementation of the second aspect, the method further includes: The communications device decapsulates the VXLAN packet to obtain the inner Ethernet frame. The communications device sends the inner Ethernet frame.

According to a third aspect, a VXLAN tunnel end point (VTEP) is provided. The VTEP includes modules that perform the method in any one of the first aspect or the implementations of the first aspect.

According to a fourth aspect, a VXLAN device is provided. The VXLAN device includes modules that perform the method in any one of the second aspect or the implementations of the second aspect.

According to a fifth aspect, a communications device is provided. The communications device includes a processor and a physical interface. The processor is configured to perform the method in any one of the first aspect or the implementations of the first aspect.

According to a sixth aspect, a communications device is provided. The communications device includes a processor and a physical interface. The processor is configured to perform the method in any one of the second aspect or the implementations of the second aspect.

According to a seventh aspect, a VXLAN system is provided. The VXLAN system includes a first communications device and a second communications device. The first communications device is configured to perform the method in any one of the first aspect or the implementations of the first aspect. The second communications device is configured to perform the method in any one of the second aspect or the implementations of the second aspect.

According to an eighth aspect, a computer-readable medium is provided. The computer-readable medium stores a program that may be executed by a computer. The program includes an instruction for performing the method in any one of the first aspect or the implementations of the first aspect.

According to a ninth aspect, a computer-readable medium is provided. The computer-readable medium stores a program that may be executed by a computer. The program includes an instruction for performing the method in any one of the second aspect or the implementations of the second aspect.

In any one of the foregoing aspects or the implementations, the group identifier is any one of the following: a user identity of a device sending the Ethernet frame, a device type identifier of the device sending the Ethernet frame, an identifier of a combination of the user identity and the device type of the device sending the Ethernet frame, and a combination of the user identity and the device type identifier of the device sending the Ethernet frame.

BRIEF DESCRIPTION OF THE DRAWINGS

FIG. 7 is an example of a policy configuration according to an embodiment.

DETAILED DESCRIPTION

The following describes the embodiments with reference to FIG. 1 to FIG. 7.

Figure 1:
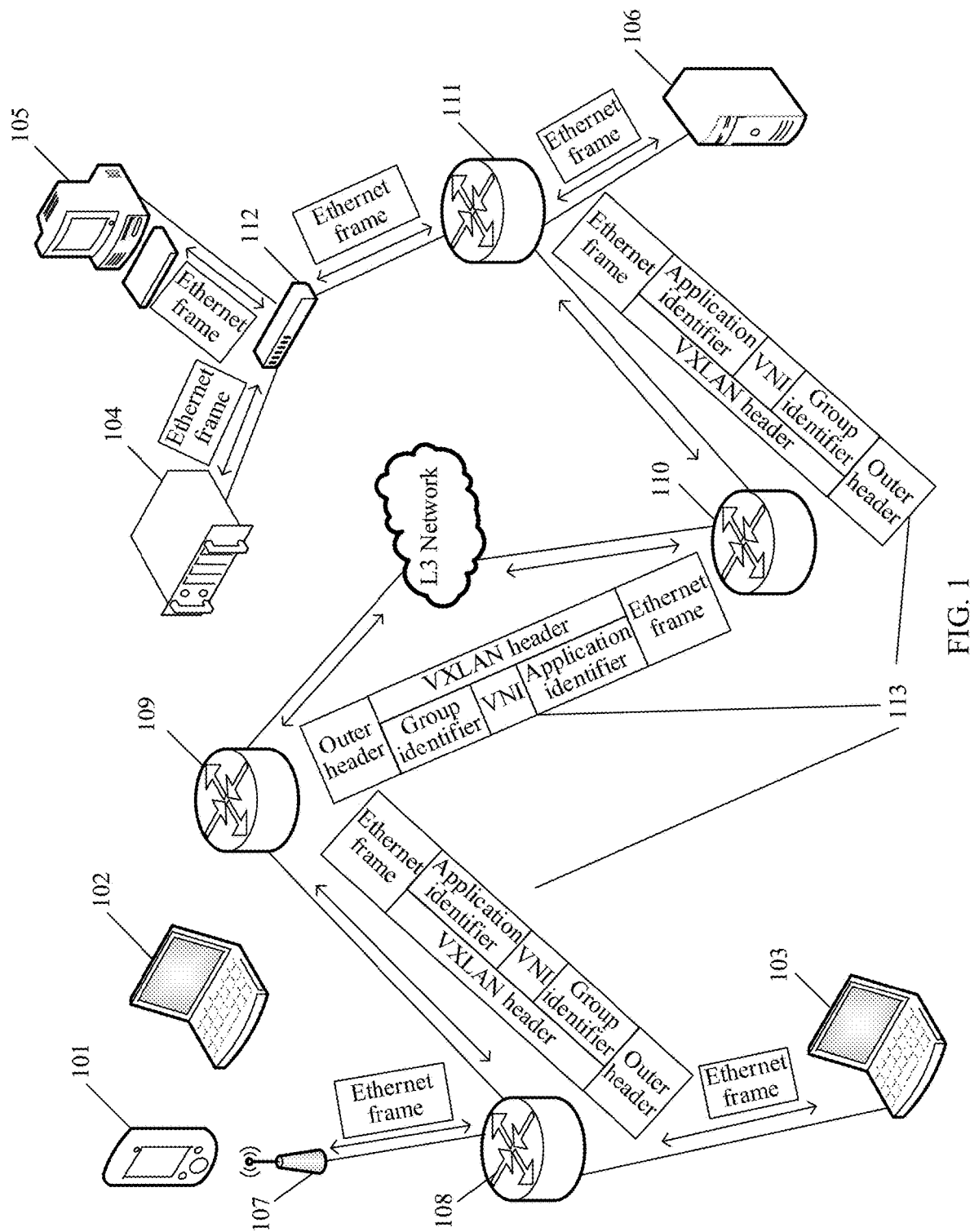
FIG. 1 is a schematic diagram of a network system according to an embodiment.

FIG. 1 is a schematic diagram of a network system according to an embodiment. The network system includes communications devices 101 to 112. The communications device may be a terminal device or a network device. For example, the communications devices 101 to 106 are terminal devices, and the communications devices 107 to 112 are network devices. The terminal device may be a computer such as a personal computer or a server; a mobile terminal such as a smartphone, a wearable device, or a vehicle-mounted device; or an Internet of things (IoT) terminal. The network device may be a network switch, a top-of-rack (TOR) switch, a router, a wireless access point, a software-defined networking (SDN) device, or the like. Some or all of the foregoing communications devices 101 to 112 are VXLAN devices. The VXLAN device is a VTEP or non-VTEP VXLAN device. The non-VTEP VXLAN device is referred to as a non-VTEP device below. VTEPs communicate with each other by using a VXLAN packet 113. A VXLAN is a solution in which a layer 3 (L3) network is overlaid with an above layer 2 (L2) network. Layer 2 is a data link layer. Layer 3 is a network layer. A network device between the VTEPs forwards the VXLAN packet 113 based on an outer header. FIG. 1 shows a structure of the packet 113 between communications devices by using an example in which the communications devices 108 to 111 are VXLAN devices. The VXLAN packet 113 between the VXLAN devices includes an Ethernet frame, a VXLAN header, and the outer header. The Ethernet frame includes an Ethernet frame header and a payload. The outer header includes an IP header and an outer User Datagram Protocol (UDP) header. The outer header may further include an Ethernet frame header. Therefore, the Ethernet frame in the VXLAN header is also referred to as an inner Ethernet frame. The VXLAN header includes a VXLAN network identifier (VNI). The VNI is also referred to as a VXLAN segment identifier (ID). A payload of the inner Ethernet frame may include zero, one, or more of the following: an inner IP header, an inner transport layer header, and another protocol header.

In this embodiment, in addition to the VNI, the VXLAN header further includes an application identifier. The VXLAN header may further include a group identifier. The group identifier is used to identify a group to which a source device of the inner Ethernet frame belongs. Therefore, if source devices of a plurality of Ethernet frames are the same, carried group identifiers of a plurality of VXLAN packets of the plurality of Ethernet frames are the same. If one group includes a plurality of devices, carried group identifiers of VXLAN packets from these devices are the same. The group identifier is any one of the following: a user identity of a device sending the inner Ethernet frame, a device type identifier of the device sending the inner Ethernet frame, an identifier of a combination of the user identity and the device type of the device sending the inner Ethernet frame, and a combination of the user identity and the device type identifier of the device sending the inner Ethernet frame.

The application identifier is used to identify an application type of the inner Ethernet frame. In a VXLAN segment, regardless of a source device, carried application identifiers of VXLAN packets of Ethernet frames of a same application are the same. Even if Ethernet frames have a same source device, if application types of the Ethernet frame are different, carried application identifiers of VXLAN packets of the Ethernet frames are different. Therefore, the application type of the Ethernet frame may be determined based on the payload of the Ethernet frame. In an application identification rule, application types may be classified based on a protocol type, an access target, a usage purpose, another factor, or any combination thereof. For example, the protocol type may be determined based on a transport layer protocol port number of the inner transport layer header in the payload of the Ethernet frame, to determine the application type. Alternatively, the protocol type may be determined based on a specific character string in the payload of the Ethernet frame, to determine the application type. Alternatively, an application server, such as an instant communications server or a game server, accessed by the Ethernet frame may be determined based on a destination IP address field of the inner IP header in the payload of the Ethernet frame, to determine the application type. Alternatively, the usage purpose, such as a high-security application, of the Ethernet frame may be determined based on content (for example, the content of the Ethernet frame includes encrypted content or a digital signature) of the Ethernet frame, to determine the application type. The content of the Ethernet frame is the parts other than the protocol header (such as the inner IP header and the inner transport layer header) in the payload of the Ethernet frame. Application identifiers of one application type in different VXLAN segments may be the same, or may be different.

Application types may be classified at a flexibly customized granularity. For example, similar protocols (such as a Trivial File Transfer Protocol (TFTP) and a File Transfer Protocol (FTP)) may be classified into one application type. For example, all instant communications applications may be classified into one application type, and all game applications may be classified into one application type. Alternatively, different protocols that are similar may be classified into different application types. For example, different instant communications applications are distinguished from different game applications. If classification is performed at a finer granularity, different traffic types (such as an FTP control channel and an FTP data channel) of one protocol or application may be classified into different application types.

The VNI and the application identifier are determined and added to the VXLAN header by a VTEP such as the communications device 108 in FIG. 1. If the group identifier is to be added, the group identifier is also determined and placed in the VXLAN header by the VTEP. Another VXLAN device (such as the communications device 109 to 111 in FIG. 1) may directly execute a corresponding policy based on the application identifier in the VXLAN header, without analyzing the packet. The another VXLAN device may be a VTEP or non-VTEP device. In addition, the non-VTEP device may directly determine a policy based on the identifier in the outer VXLAN header, without decapsulating the VXLAN packet to view the inner Ethernet frame. Therefore, the solution provided in this embodiment reduces network load. The VTEP analyzes the payload of the Ethernet frame by using the application identification rule, to determine the application identifier. The application identification rule may be fixed and quasi-static (for example, a controller updates a new application type), or may be dynamically changed (for example, a PORT command or a PASV response in the FTP control channel are read to obtain a port number of the FTP data channel, and the port number is recorded to identify a future FTP data channel).

Figure 2:
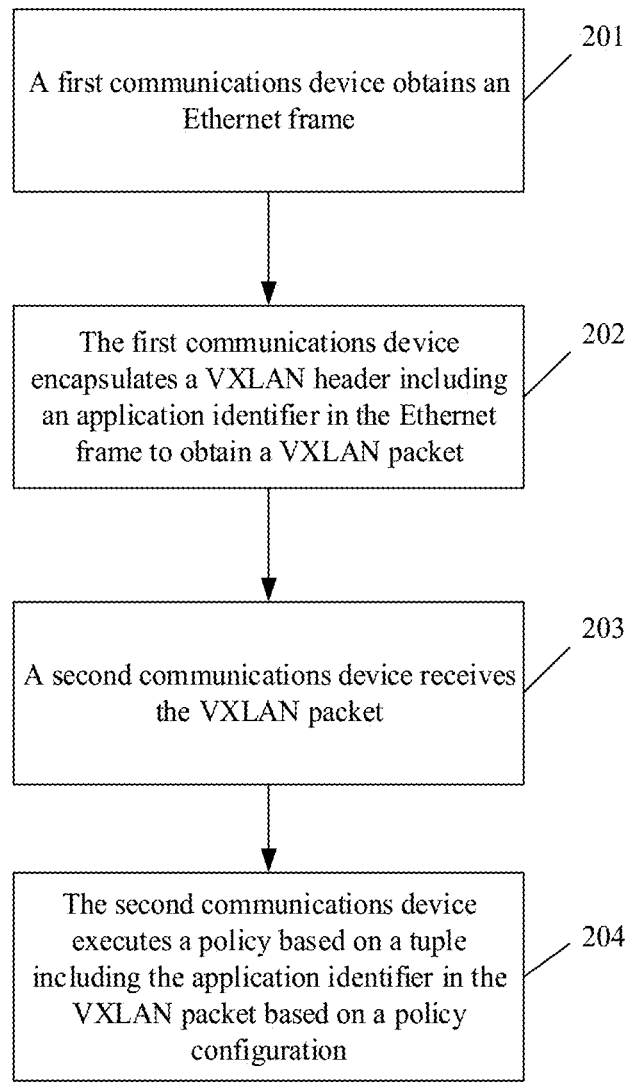
FIG. 2 is a flowchart of a method according to an embodiment.

FIG. 2 is a flowchart of a method according to an embodiment. In this flowchart, a first communications device implements a VXLAN packet encapsulation method, and a second communications device implements a policy execution method.

The first communications device is a VTEP. The first communications device may be any one of the communications devices 101 to 112 in FIG. 1. If the first communications device is any one of the terminal devices 101 to 106 in FIG. 1, the first communications device generates a VXLAN packet including an application identifier. If the first communications device is any one of the network devices 107 to 111 in FIG. 1, the first communications device generates the VXLAN packet including the application identifier based on a packet received from another communications device. If the network device receives an Ethernet frame, the network device encapsulates a VXLAN header including the application identifier in, or on, over, or with, the Ethernet frame to obtain the VXLAN packet. If the network device (such as a wireless access point (AP) 107 in FIG. 1) receives a packet of another type (such as a wireless local area network (WLAN) frame), the network device converts the received packet into the Ethernet frame, and then encapsulates the VXLAN header including the application identifier in the Ethernet frame to obtain the VXLAN packet.

The second communications device may be another VTEP, or may be a non-VTEP device, provided that the second communications device can read the application identifier and execute a corresponding policy. The non-VTEP device may be a device that supports a VXLAN protocol, or may only be capable of reading the application identifier. If the non-VTEP device does not support the VXLAN protocol, a read rule may be set in the non-VTEP device. The read rule may be reading a bit of a fixed offset or a fixed-length after an outer header as the application identifier. For example, the first communications device is the wireless AP 107 in FIG. 1, the second communications device is a rack-mounted server 104 in FIG. 1, and both the wireless access point 107 and the rack-mounted server 104 are VTEPs. The rack-mounted server 104 receives the VXLAN packet from the wireless AP 107. A virtual machine monitor (VMM) in the rack-mounted server 104 implements a VTEP function to decapsulate the VXLAN packet and execute the corresponding policy based on the application identifier. Then, the VMM sends the Ethernet frame obtained through decapsulation to a corresponding virtual machine (VM). For another example, the first communications device is a computer 105 in FIG. 1, and the second communications device is a router 111 in FIG. 1. The router 111 receives the VXLAN packet from the computer 105, and reads the application identifier in the VXLAN header. If the corresponding policy is "discard", the router 111 discards the VXLAN packet. If the corresponding policy is "forward", the router 111 forwards the VXLAN packet.

The method shown in FIG. 2 includes the following steps.

201: A first communications device obtains an Ethernet frame. The obtaining action includes generation, conversion, and receiving actions. For example, the first communications device or a VM running in the first communications device generates the Ethernet frame. For another example, the first communications device converts a frame of another protocol type into the Ethernet frame. For still another example, the first communications device receives the Ethernet frame through an electrical interface or an optical interface.

202: The first communications device encapsulates a VXLAN header including an application identifier in the Ethernet frame to obtain a VXLAN packet. The application identifier is identified based on a payload of the Ethernet frame and an application identification rule. The Ethernet frame encapsulated in the VXLAN packet may be referred to as an inner Ethernet frame. The first communications device sends the VXLAN packet. For example, the first communications device may directly send the VXLAN packet. Alternatively, the first communications device may first execute a corresponding policy based on a tuple including the application identifier. If the policy is "discard," the first communications device may not send the VXLAN packet. If the policy is "send," the first communications device sends the VXLAN packet. The VXLAN header may further include a group identifier. The group identifier is determined by the first communications device based on a source of the Ethernet frame and a group mapping. The group mapping is a mapping from at least one address to at least one group identifier. The tuple may further include the foregoing group identifier. The tuple may further include a destination of the inner Ethernet frame.

203: A second communications device receives the VXLAN packet. The second communications device is a device that supports a VXLAN. If a device that does not support the VXLAN receives the VXLAN packet, the device forwards the VXLAN packet based on an outer IP header or an outer data link layer header of the VXLAN packet.

204: The second communications device executes a policy based on a tuple, according to a policy configuration. The tuple includes the application identifier in the VXLAN packet. The tuple may further include the group identifier in the VXLAN packet. The tuple may further include the destination of the inner Ethernet frame (for example, a destination IP address, a destination medium access control (MAC) address, or a group identifier corresponding to a destination address of the inner Ethernet frame). If the second communications device is a VTEP, the second communications device further decapsulates the VXLAN packet to obtain the inner Ethernet frame. If the policy is not discarding, the second communications device sends the inner Ethernet frame.

The policy configuration is a mapping from a tuple to a policy. The policy configuration may be manually configured, or may be dynamically obtained. A communications device may obtain the policy configuration in advance, or may obtain the policy configuration based on a requirement after receiving the VXLAN packet. If there are a plurality of communications devices that may execute a tuple-based policy on a forwarding path of the VXLAN packet, these communications devices may execute a same policy, or may execute different policies. For an example of the policy configuration, refer to FIG. 7.

In step 202, if the first communications device needs to determine the group identifier based on the source of the Ethernet frame and the group mapping, the first communications device needs to be capable of obtaining the group mapping. The group mapping may be manually configured, or may be dynamically obtained. The first communications device may obtain the group mapping in advance, or may obtain the group mapping based on a requirement after obtaining the Ethernet frame. The first communications device may receive the group mapping from a controller, an authentication server, or an authenticator device. The source of the Ethernet frame may be determined based on one or more of the following: an address of a device sending the Ethernet frame, a virtual local area network (VLAN) identifier of the Ethernet frame, and a port number of a port used by the communications device to receive the Ethernet frame.

For example, the first communications device is a computer 105 in FIG. 1. A VMM in the computer 105 implements a VTEP function. The VMM receives the group mapping from the controller (such as a virtual control center), and the group mapping includes a group identifier corresponding to each VM in the computer 105. The VMM receives the Ethernet frame from the VM, and determines, based on a source address (such as a source MAC address or a source IP address) of the Ethernet frame and the group mapping, the group identifier used to encapsulate the VXLAN header in the Ethernet frame. Alternatively, the VMM receives the Ethernet frame from the VM, and determines, based on a virtual interface of the Ethernet frame (such as a virtual station interface (VSI)) and the group mapping, the group identifier used to encapsulate the VXLAN header in the Ethernet frame.

For another example, the first communications device is a router 111 in FIG. 1, and the group identifier is related to a user authentication result. An authentication architecture using an Extensible Authentication Protocol (EAP) is used as an example. The EAP architecture includes a supplicant device, an authenticator device, and an authentication server. If the router 111 is an authenticator device, after the router 111 successfully authenticates a terminal device (such as a server 106), the router 111 receives the group mapping from the authentication server. The group mapping includes a mapping from an address of the terminal device (the server 106) or an interface connecting the router 111 and the terminal device to a group identifier of the terminal device.

If the router 111 is not an authenticator device, the router 111 obtains the group mapping. The group mapping includes a mapping from a VLAN identifier to the group identifier. After the authenticator device such as a switch 112 successfully authenticates a terminal device such as the computer 105, the authenticator device receives a port VLAN ID (PVID) configuration from the authentication server. The PVID configuration includes a default VLAN identifier of a port connected to the terminal device. After receiving the Ethernet frame from the terminal device through the port, the authenticator device adds a VLAN tag including the default VLAN identifier to the Ethernet frame, and forwards the Ethernet frame. After receiving the Ethernet frame, the router 111 obtains the group identifier in the Ethernet frame based on the VLAN identifier in the VLAN tag of the Ethernet frame and the group mapping.

For an example of the policy configuration, refer to FIG. 7 and the following description.

Example 1: A router 108 detects a video stream, adds an application identifier 1 to a VXLAN packet in which the video stream is encapsulated, and reserves a bandwidth of 10 megabits per second (Mbps). All VXLAN devices that receive the VXLAN packet carrying the application identifier 1 reserve a bandwidth of 10 Mbps for the VXLAN packet.

Example 2: A smartphone 101 generates a voice flow, and adds an application identifier 2 to a VXLAN packet in which the voice flow is encapsulated. All VXLAN devices that receive the VXLAN packet carrying the application identifier 2 select a low-latency path to forward the VXLAN packet.

Example 3: A VMM of the server 106 detects a video conference application data flow from a VM 1. Because the VM 1 is a virtual machine of a VIP tenant, the VMM adds a group identifier V1 and an application identifier 3 to a VXLAN packet in which the data flow is encapsulated, and reserves a bandwidth of 1 Gbps and provides a highest forwarding priority for the VXLAN packet. All VXLAN devices that receive the VXLAN packet carrying the group identifier V1 and the application identifier 3 reserve a bandwidth of 1 Gbps and provide a highest forwarding priority for the VXLAN packet, and select a low-latency path to forward the VXLAN packet. The VMM of the server 106 also detects a website access data flow from the VM 1. The VMM adds the group identifier V1 and an application identifier 4 to a VXLAN packet in which the data flow is encapsulated, and provides a medium forwarding priority for the VXLAN packet. All VXLAN devices that receive the VXLAN packet carrying the group identifier V1 and the application identifier 4 provide a medium forwarding priority for the VXLAN packet.

Example 4: The VMM of the rack-mounted server 104 detects an FTP request for accessing the server 106 from a VM 2. The VMM adds a group identifier 2 and an application identifier 5 to a VXLAN packet in which the FTP request is encapsulated, and forwards the VXLAN packet. The router 111 is a destination VTEP of the VXLAN packet. The router 111 reads the group identifier 2 and the application identifier 5, and determines that the destination of the inner Ethernet frame is the server 106. The router 111 determines, based on the policy configuration, that the inner Ethernet frame of the VXLAN packet carrying the group identifier 2 and the application identifier 5 cannot access the server 106 (that is, a VM belonging to a group identified by the group identifier 2 does not have permission to access an FTP application of the server 106). In this case, the router 111 discards the inner Ethernet frame. The VMM of the rack server 104 also detects a Hypertext Transfer Protocol (HTTP) request for accessing the server 106 from a VM 3. The VM 3 and the VM 2 belong to a same group. The VMM adds the group identifier 2 and the application identifier 4 to the VXLAN packet in which the FTP request is encapsulated, and forwards the VXLAN packet. The router 111 reads the group identifier 2 and the application identifier 4, and determines that the destination of the inner Ethernet frame is the server 106. The router 111 determines, based on the policy configuration, that the inner Ethernet frame of the VXLAN packet carrying the group identifier 2 and the application identifier 4 can access the server 106 (that is, the VM belonging to the group identified by the group identifier 2 has permission to access a web application of the server 106). In this case, the router 111 forwards the inner Ethernet frame to the server 106.

Example 5: A scenario of the example 5 is similar to that of the example 4. The VMM of the rack server 104 detects an FTP request for accessing the server 106 from a VM 2. The VMM determines that a group identifier and an application identifier in the FTP request are a group identifier 2 and an application identifier 5 respectively. The VMM determines that a destination of the FTP request is the server 106. The VMM determines, based on the policy configuration, that the inner Ethernet frame of the VXLAN packet carrying the group identifier 2 and the application identifier 5 cannot access the server 106. In this case, to avoid a network resources waste, the FTP request is discarded by the VMM, instead of being discarded by the router 111 after the VXLAN packet in which the FTP request is encapsulated arrives at the router 111. The VMM may discard the FTP request before or after the VXLAN header is encapsulated for the FTP request.

Figure 3:
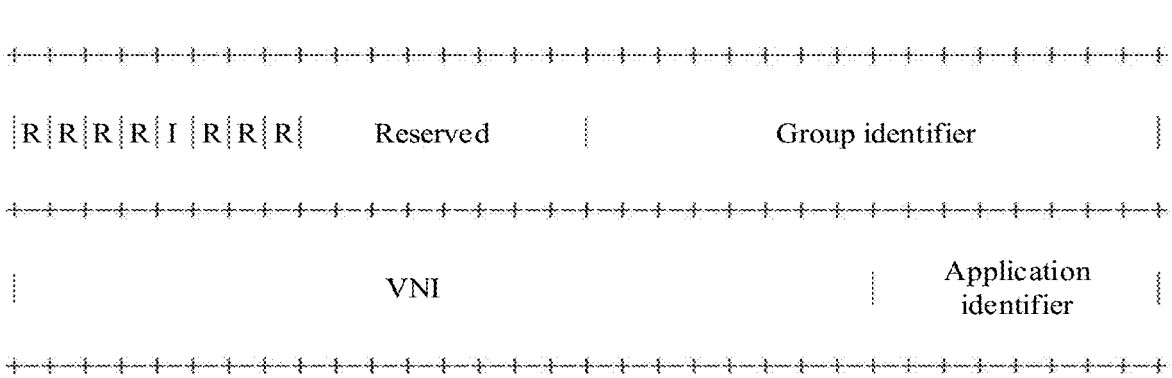
FIG. 3 is an example of a format of a VXLAN header in a VXLAN packet according to an embodiment.

FIG. 3 is an example of a format of a VXLAN header in a VXLAN packet according to an embodiment. In FIG. 3, the first eight bits in the VXLAN header are flag bits. "R" is a reserved flag bit, and "I" is an indicator flag bit. When the VXLAN header includes a valid VNI, the I flag bit is 1, and the next eight bits are reserved fields. A group identifier occupies two octets before the VNI, and an application identifier occupies one octet after the VNI. In this embodiment, the VXLAN header may include no group identifier, and a corresponding location may be used as a reserved field. Locations of the group identifier and the application identifier in FIG. 3 are merely an example. The group identifier and the application identifier in this embodiment may be at different locations in the VXLAN header, and have different lengths from those shown in FIG. 3. For example, the location of the group identifier may be interchanged with the location of the application identifier in FIG. 3. One or more of the reserved flag bits in the VXLAN header may be selected as indicator flag bits to indicate that the VXLAN header includes the group identifier and/or the application identifier.

Figure 4:
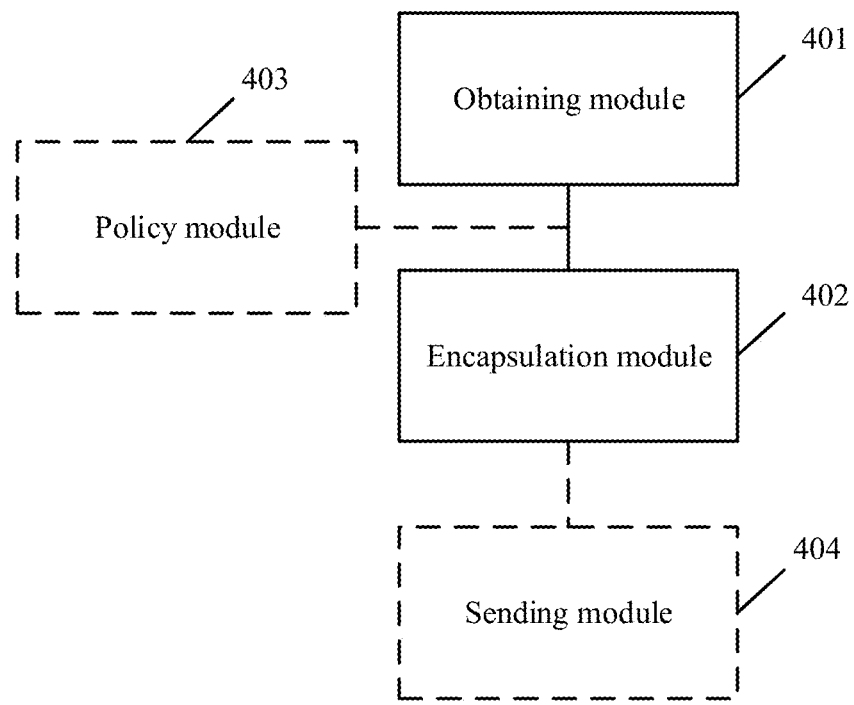
FIG. 4 is a structural diagram of a VTEP according to an embodiment.

FIG. 4 is a structural diagram of a VTEP according to an embodiment. The VTEP includes an obtaining module 401 and an encapsulation module 402. The VTEP may further include a policy module 403. The VTEP may further include a sending module 404. The obtaining module 401 is configured to perform step 201 in the method embodiment shown in FIG. 2. The encapsulation module 402 is configured to perform step 202 in the method embodiment shown in FIG. 2. The policy module 403 is configured to perform an optional policy execution step in the method embodiment shown in FIG. 2. The sending module 404 is configured to send a VXLAN packet.

Figure 5:
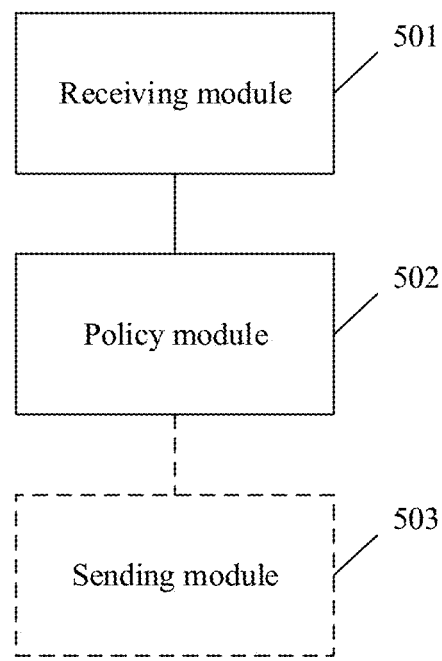
FIG. 5 is a structural diagram of a VXLAN device according to an embodiment.

FIG. 5 is a structural diagram of a VXLAN device according to an embodiment. The VXLAN device includes a receiving module 501 and a policy module 502. The VXLAN device may further include a sending module 503. The receiving module 501 is configured to perform step 203 in the method embodiment shown in FIG. 2. The policy module 502 is configured to perform step 204 in the method embodiment shown in FIG. 2. If the policy in step 204 is "send", the sending module 503 decapsulates a VXLAN packet to obtain an inner Ethernet frame, and sends the inner Ethernet frame.

Figure 6:
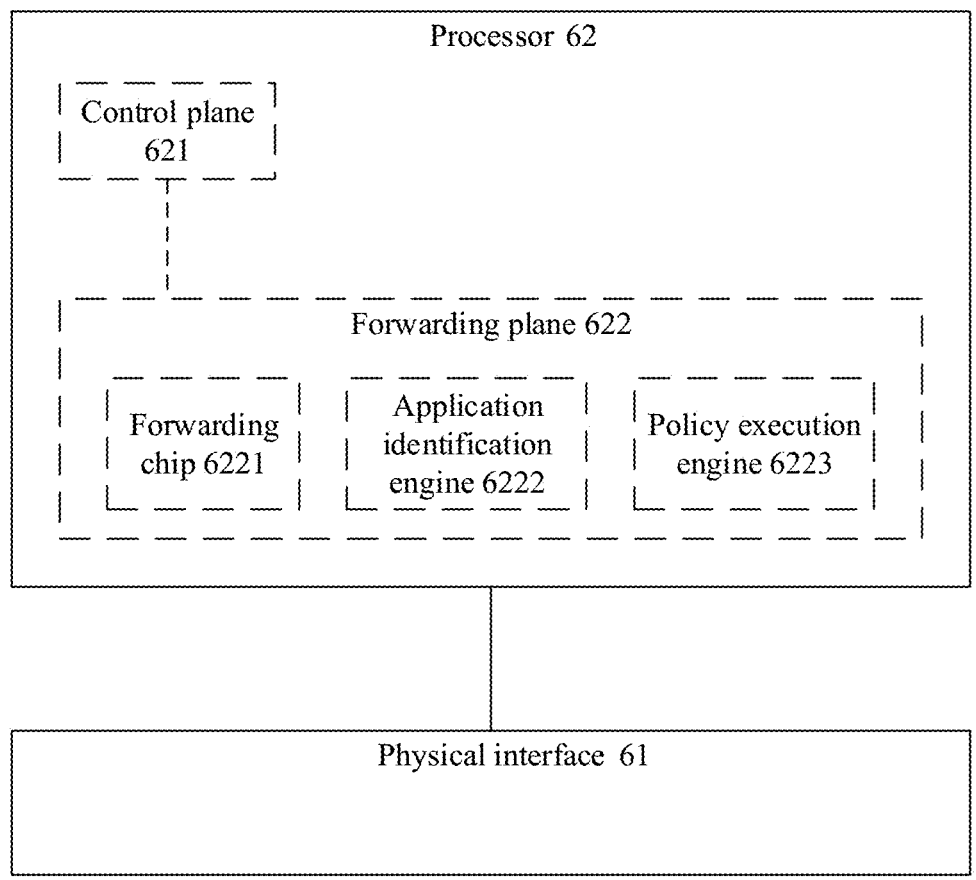
FIG. 6 is a structural diagram of a communications device according to an embodiment.

FIG. 6 is a structural diagram of a communications device according to an embodiment. The communications device may be any one of the communications devices 101 to 112 in FIG. 1. The communications device includes a physical interface 61 and a processor 62. The physical interface 61 is configured to receive and send an Ethernet frame and/or a VXLAN packet. The processor 62 is configured to perform the method steps performed by the first communications device or the second communications device in FIG. 2.

There may be one or more physical interfaces 61. The physical interface 61 may include a wireless interface and/or a wired interface. For example, the wireless interface may include a WLAN interface, a Bluetooth interface, a cellular network interface, or any combination thereof. The wired interface may include an Ethernet interface, an asynchronous transfer mode interface, a fiber channel interface, or any combination thereof. The Ethernet interface may be an electrical interface or an optical interface. Although the Ethernet frame is encapsulated in the VXLAN packet, an outer layer of the VXLAN packet does not need to be transmitted over the Ethernet. For example, a VM and a VMM are run in a laptop computer 102 in FIG. 1. The VMM receives the Ethernet frame from the VM and obtains the VXLAN packet through encapsulation. The laptop computer 102 sends the VXLAN packet through the WLAN interface. Therefore, the physical interface 61 does not necessarily include the Ethernet interface.

There may be one or more processors 62. The processor 62 includes a central processing unit (CPU), a network processor (NP), a graphics processing unit (GPU), an application-specific integrated circuit (ASIC), a programmable logic device (PLD), or any combination thereof. The PLD may be a complex PLD (CPLD), a field-programmable gate array (FPGA), generic array logic (GAL), or any combination thereof. If the communications device is a terminal device, the method steps in the embodiment shown in FIG. 2 are usually implemented by software running in the processor 62 (such as a CPU). If the communications device is a network device, the processor 62 may include a control plane 621 and a forwarding plane 622. The control plane 621 and the forwarding plane 622 may be implemented by independent circuits, or may be integrated into one circuit. For example, the processor 62 is a multi-core CPU. One or more of a plurality of cores implement the control plane 621, and the other cores implement the forwarding plane 622. For another example, the control plane 621 is implemented by the CPU, and the forwarding plane 622 is implemented by the NP, the ASIC, the FPGA, or any combination thereof. For another example, the communications device is a frame-shaped network device, the control plane 621 is implemented by a main control card, and the forwarding plane 622 is implemented by a line card. For another example, both the control plane 621 and the forwarding plane 622 are implemented by the NP with a control plane capability.

Further, based on functions, the forwarding plane 622 may be divided into a forwarding chip 6221, an application identification engine 6222, and a policy execution engine 6223. The forwarding chip 6221, the application identification engine 6222, and the policy execution engine 6223 may be separately implemented by a plurality of independent chips, or may be implemented by a single chip. For example, the application identification engine 6222 may be implemented by a content-addressable memory (CAM) (such as a ternary CAM (TCAM)). The application identification engine 6222, integrated with the forwarding chip 6221, may be implemented by the NP.

If the communications device does not implement a VTEP function, that is, the communications device works as the second communications device in the embodiment shown in FIG. 2, the control plane 621 and the application identification engine 6222 do not need to participate in the policy execution method implemented by the communications device. The policy execution engine 6223 of the communications device stores a policy configuration. The policy execution engine 6223 executes a policy based on a tuple, according to the policy configuration and a tuple including an application identifier provided by the forwarding chip 6221.

If the communications device implements a VTEP function, the control plane 621 sets an application identification rule in the application identification engine 6222. The application identification engine 6222 identifies an application type of the Ethernet frame based on the application identification rule and a payload of the Ethernet frame. The application identification engine 6222 sends an identification result to the forwarding chip 6221. The forwarding chip 6221 encapsulates a VXLAN header including the application identifier in the Ethernet frame to obtain the VXLAN packet. If a policy does not need to be executed, the forwarding chip 6221 directly forwards the VXLAN packet to the corresponding physical interface 61. In this case, the policy execution engine 6223 does not need to participate in the VXLAN packet encapsulation method implemented by the communications device. If a policy needs to be executed, the policy execution engine 6223 executes the tuple-based policy according to the policy configuration and the tuple including the application identifier provided by the forwarding chip 6221.

All or some of the foregoing embodiments may be implemented by using software, hardware, or a combination thereof. When software or a combination of software and hardware is used to implement the embodiments, all or some of the embodiments may be implemented in the form of a computer program product. The computer program product includes one or more computer instructions. When the computer program instructions are loaded and executed on a computer, the procedure or functions according to the embodiments are all or partially generated. The computer may be a general-purpose computer, a special-purpose computer, a computer network, or other programmable apparatuses. The computer instructions may be stored in a storage medium or may be transmitted from one storage medium to another storage medium. For example, the computer instructions may be transmitted from a web site, computer, server, or data center to another website, computer, server, or data center in a wired (for example, a coaxial cable, a twisted pair or an optical fiber) or wireless (for example, infrared, wireless or microwave) manner. The storage medium may be any medium accessible by the computer, or a data storage device, such as a server or a data center, integrating one or more media. The medium may be a magnetic medium (for example, a floppy disk, a hard disk, or a magnetic tape), an optical medium (for example, an optical disc), a semiconductor medium (for example, a solid-state drive (SSD)), or the like.

The foregoing descriptions are merely specific implementations, but are not intended to limit the protection scope of the present disclosure. Any variation or replacement readily figured out by a person skilled in the art shall fall within the protection scope of the present disclosure. Therefore, the protection scope of the present disclosure shall be subject to the protection scope of the claims.

What is claimed is:

1. A method implemented by a communications device and comprising:
   obtaining an Ethernet frame comprising a payload; and
   encapsulating a Virtual Extensible Local Area Network (VXLAN) header with the Ethernet frame to obtain a VXLAN packet,
   wherein the VXLAN header comprises an application identifier (ID), a group ID, and a VXLAN network ID (VNI),
   wherein the application ID identifies an application type of the Ethernet frame,
   wherein the payload and an application identification rule identify the application ID, and
   wherein the group ID maps to a source of the Ethernet frame via a group mapping.

2. The method of claim 1, wherein the application identification rule comprises identifying a protocol type of the payload.

3. The method of claim 1, wherein the application identification rule comprises identifying an access target of the Ethernet frame.

4. The method of claim 1, wherein the application identification rule comprises identifying a usage purpose of the Ethernet frame.

5. The method of claim 1, wherein the application identification rule comprises determining a protocol type of the payload based on a transport layer protocol port number in the payload.

6. The method of claim 1, wherein the application identification rule comprises determining a protocol type of the payload based on a specific character string in the payload.

7. The method of claim 1, wherein the application identification rule comprises determining an access target of the Ethernet frame based on a destination Internet Protocol (IP) address field in the payload.

8. The method of claim 1, wherein the application identification rule comprises determining a usage purpose of the Ethernet frame based on content of the Ethernet frame.

9. The method of claim 1, further comprising executing a policy based on a tuple and a policy configuration, wherein the tuple comprises the application ID.

10. The method of claim 1, further comprises executing a policy based on a tuple and a policy configuration, wherein the tuple comprises the group ID and the application ID.

11. A method implemented by a communications device and comprising:
receiving a Virtual Extensible Local Area Network (VXLAN) packet comprising a VXLAN header, wherein the VXLAN header comprises an application identifier (ID) a group ID, and a VXLAN network ID (VNI), wherein the application ID identifies an application type of an inner Ethernet frame in the VXLAN packet, and wherein the group ID maps to a source of the inner Ethernet frame via a group mapping; and
executing a policy based on a tuple and a policy configuration,
wherein the tuple comprises the application ID.

12. The method of claim 11, wherein the tuple further comprises the group ID.

13. The method of claim 11, wherein the tuple further comprises a destination of the inner Ethernet frame.

14. The method of claim 11, further comprising:
decapsulating the VXLAN packet to obtain the inner Ethernet frame; and
sending the inner Ethernet frame.

15. A communications device comprising:
a physical interface; and
a processor coupled to the physical interface and configured to:
obtain an Ethernet frame comprising a payload;
encapsulate a Virtual Extensible Local Area Network (VXLAN) header with the Ethernet frame to obtain a VXLAN packet, wherein the VXLAN header comprises an application identifier (ID), a group ID, and a VXLAN network ID (VNI), wherein the application ID identifies an application type of the Ethernet frame, wherein the payload and an application identification rule identify the application ID, and wherein the group ID maps to a source of the Ethernet frame via a group mapping; and
send the VXLAN packet through the physical interface.

16. The communications device of claim 15, wherein the application identification rule comprises identifying a protocol type of the payload, an access target of the Ethernet frame, or a usage purpose of the Ethernet frame.

17. The communications device of claim 15, wherein the processor is further configured to execute a policy based on a tuple and a policy configuration, wherein the tuple comprises the application ID.

18. The communications device of claim 15, wherein the processor is further configured to execute a policy based on a tuple and a policy configuration, wherein the tuple comprises the group ID and the application ID.

19. A communications device comprising:
a physical interface; and
a processor coupled to the physical interface and configured to:
receive a Virtual Extensible Local Area Network (VXLAN) packet through the physical interface, wherein the VXLAN packet comprises a VXLAN header, wherein the VXLAN header comprises an application identifier (ID), a group ID, and a VXLAN network ID (VNI), wherein the application ID identifies an application type of an inner Ethernet frame in the VXLAN packet, and wherein the group ID maps to a source of the inner Ethernet frame via a group mapping; and
execute a policy based on a tuple and a policy configuration,
wherein the tuple comprises the application ID.

20. The communications device according to claim 19, wherein the processor is further configured to:
decapsulate the VXLAN packet to obtain the inner Ethernet frame; and
send the inner Ethernet frame through the physical interface.

* * * * *